July 7, 1970  K. C. STEWART ET AL  3,518,780
LONGITUDINAL WAVE PROPAGATION DEMONSTRATORS
Filed March 27, 1968

INVENTORS
Kenneth C. Stewart &
Ernest J. Burgi their attorneys

United States Patent Office 3,518,780
Patented July 7, 1970

3,518,780
LONGITUDINAL WAVE PROPAGATION DEMONSTRATORS
Kenneth C. Stewart, 344 Bellwalt Drive, McGran Hills, Bridgeville, Pa. 15017, and Ernest J. Burgi, Box 291–A, R.D. 2, Cheswick, Pa. 15024
Filed Mar. 27, 1968, Ser. No. 716,553
Int. Cl. G09b 23/06
U.S. Cl. 35—19                                      6 Claims

ABSTRACT OF THE DISCLOSURE

A longitudinal wave propagation demonstrator is provided with a multiplicity of like masses movably mounted on guide means and connected by like resilient members and a reciprocating drive connected to one of said masses to impart motion thereto.

---

Figure 1:
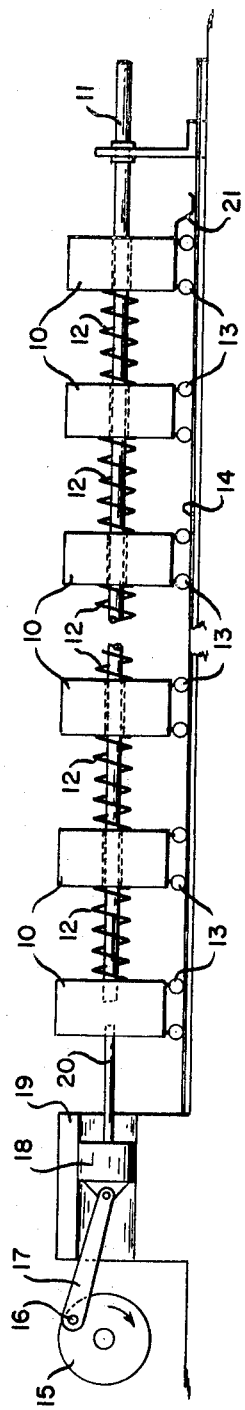

This invention relates to longitudinal wave propagation demonstrators and particularly to an apparatus for demonstrating longitudinal wave motion by moving resiliently connected masses in a longitudinal direction. The need for demonstrating wave motion has long been recognized as an adjunct to the teaching of scientific principles in physics and related scientific educational courses. The demonstration of longitudinal wave propagation has, however, been quite difficult to accomplish. The use of transverse wave motion devices has been generally used in an effort to demonstrate the effects of longitudinal motion. Such demonstrators obviously have many defects. They do not convey to the viewer the precise form of motion involved in this physical phenomenon and are less than satisfactory for the purpose desired. Many attempts have been made to provide wave motion demonstrators capable of demonstrating longitudinal motion but they have either been so complex as to be impractical or have failed to be effective in conveying the desired phenomenon.

We have invented a longitudinal wave motion demonstrator which is simple in construction and clearly shows the manner in which longitudinal waves are propagated in various media. The apparatus of our invention is capable of visually demonstrating various phenomena associated with wave motion and wave motion properties. The apparatus can, for example, demonstrate cycle, frequency, amplitude, attenuation, wave length, particle velocity, phase, propagation velocity, characteristic impedance termination, reflection, infinite termination and propagation constant. All of these are highly desirable properties in the apparatus and may be for the first time demonstrated in a single, simple unit.

In a preferred embodiment of our invention, we provide a plurality of spaced, substantially identical masses connected by substantially identical resilient means, said masses being movably mounted on a horizontally extending guide means and drive means connected to one of said masses to reciprocate said one of said masses on said guide means whereby said motion is transferred through the resilient means to each of the plurality of spaced masses in succession. Preferably, the resilient means are helical springs connecting the masses at their center. The guide means is preferably spaced rails carrying wheels on each of the masses, although the guide means may equally well be a rod extending through passages in each of the masses. The drive means is preferably a driven rotary crank connected to a piston through a connection rod pivoted on an eccentric member on the crank, the piston being connected to one of the masses and reciprocable parallel to the guide means. Preferably we also provide micro-switches at each of the normal terminal points for the individual masses which actuate lights corresponding to the masses so that as the mass moves, a light is energized visually demonstrating the successive motion of the masses during the demonstrator's movement. We also preferably provide an adjustable resistance element on each mass and adjustable characteristic impedance termination means acting on the terminal mass.

Figure 2:
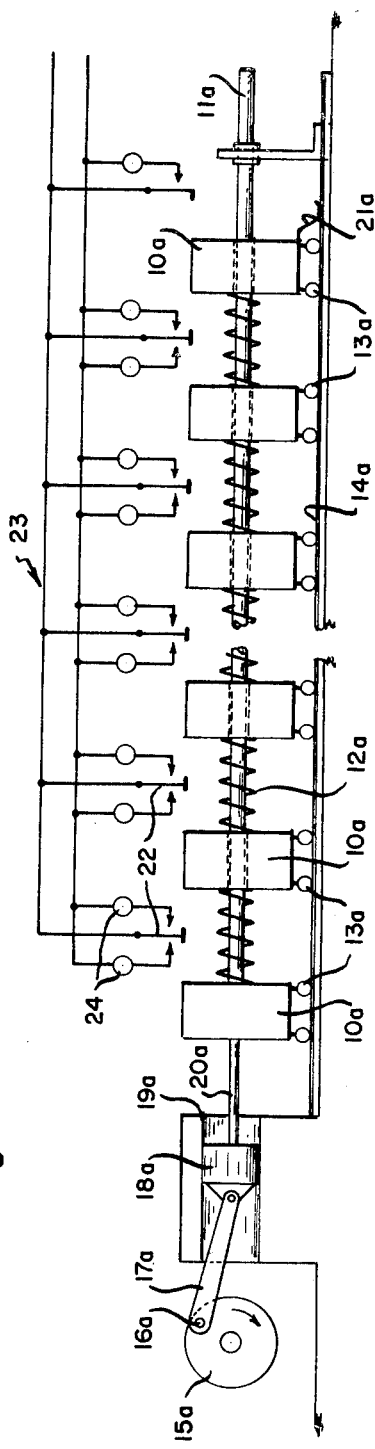

In the foregoing general description, we have set out certain objects, purposes and advantages of our invention. Other objects, purposes and advantages will be apparent from a consideration of the following description and the accompanying drawings in which:

FIG. 1 is a side elevational view of one embodiment of wave propagating demonstrator according to our invention; and FIG. 2 is a longitudinal elevation of a second embodiment of wave form demonstrator according to our invention.

Referring to the drawings, we have illustrated a plurality of masses 10 spaced apart along a horizontally extending rod 11 which extends through the midpoint of each of the masses. A spring 12 is connected to each of the masses at its midpoint and surrounds the rod 11. Each of the masses 10 are mounted on wheels 13 which run on rails 14 parallel to the rod 11. A crank wheel 15 driven by an electric motor (not shown) is provided with a crank pin 16 connected to one end of a connecting rod 17. The other end of the connecting rod 17 is connected to a piston 18 moving in a guide 19 for reciprocation parallel to the rod 11. The piston 18 is connected by means of a connecting pin 20 with one of the masses 10. When the wheel 15 is rotated, the crank pin 16 imparts to the piston 18 reciprocal motion parallel to rod 11. This in turn is transmitted to the mass 10 which moves on rod 11 on wheels 13 and rail 14. Motion of the mass 10 is imparted to the next succeeding mass through the spring 12. This continues down the line of the successive masses until the last mass in order is moved. Meanwhile, the motion of the crank pin 16 has carried the piston 18 rearwardly from its original position moving the mass 10 in the opposite direction from its original motion and this reversal of direction is then imparted through springs 12 to the succeeding masses so that the successive waves which occur in longitudinal wave propagation are clearly illustrated by the succeeding masses moving in obedience to the motion of the crank pin 16. An adjustable characteristic impedance termination means 21 is provided acting on the terminal mass of the plurality of masses 10 to stop the same after one wave motion, thereby preventing reflection and the resulting irregularities of wave form.

Referring to FIG. 2, we have illustrated a second embodiment which is generally in the form of apparatus illustrated in FIG. 1. The parts which are identical with those of FIG. 1 bear like numbers with the suffix a. Adjacent each of the masses 10a there is provided a micro-switch 22 connected to a circuit 23 and a lamp 24. Motion of the masses is as described in connection with FIG. 1. However, as the mass 10a moves past the micro-switch 22 it closes the circuit energizing the lamp. As the successive masses are moved, the lamps are successively lighted showing the propagation of the wave in the given direction.

While I have illustrated and described a presently preferred practice and embodiment of my invention, it will be understood that it may be otherwise embodied within the scope of the following claims.

We claim:

1. An apparatus for demonstrating longitudinal wave motion comprising a plurality of spaced substantially identical masses connected by substantially identical resilient means, said masses being movably mounted on horizontally extending guide means, and a regularly reciprocable drive means connected to one of said masses to reciprocate said mass on said guide means whereby said motion is transferred through the resilient means to each of the plurality of spaced masses in succession.

2. An apparatus as claimed in claim 1 wherein the resilient means are helical springs.

3. An apparatus as claimed in claim 1 wherein the guide means are spaced rails carrying wheels on each of said masses.

4. An apparatus as claimed in claim 1 wherein the guide means is a rod extending through a like passage in each of the masses.

5. An apparatus as claimed in claim 1 wherein the drive means is a dirven rotary crank connected to a piston through a connecting rod, said piston being connected to one of said masses and being reciprocable parallel to the guide means.

6. An apparatus as claimed in claim 1 having lamp means adjacent each mass, a source of energy for said lamp means and switch means connected to each lamp means in the path of each mass adapted to connect the source of energy to said lamp means when the mass is moved.

References Cited
UNITED STATES PATENTS

| | | | |
|---|---|---|---|
| 1,825,739 | 10/1931 | Klopsteg | 35—19 |
| 1,988,755 | 1/1935 | Smith | 46—216 |

EUGENE R. CAPOZIO, Primary Examiner

H. S. SKOGQUIST, Assistant Examiner